United States Patent

[11] 3,625,127

| [72] | Inventor | Hiroshi Tsuda |
| | | Tokyo, Japan |
| [21] | Appl. No. | 19,790 |
| [22] | Filed | Mar. 16, 1970 |
| [45] | Patented | Dec. 7, 1971 |
| [73] | Assignee | Olympus Optical Co., Ltd. |
| | | Tokyo, Japan |

[54] AUTOMATIC RELEASE MECHANISM OF AN ELECTRONIC SHUTTER
2 Claims, 5 Drawing Figs.

[52] U.S. Cl. .................................................. 95/53 E,
95/12, 355/45
[51] Int. Cl. ................................................. G03b 17/40
[50] Field of Search .......................................... 95/11, 12,
31 EL, 53 R, 53 E, 53 EA

[56] References Cited
UNITED STATES PATENTS

| 3,470,803 | 10/1969 | Fukuoka et al. | 95/31 EL |
| 3,252,370 | 5/1966 | Luther | 95/31 EL |
| 3,007,385 | 11/1961 | Fukuoka | 95/31 EL |

Primary Examiner—Samuel S. Matthews
Assistant Examiner—Russell E. Adams, Jr.
Attorney—Kelman and Berman ABSTRACT: Automatic release mechanism for a camera mounted on a microscope for photographing an object while the same is being observed. A shutter release member is actuated by a cam rotated by a motor so as to open the shutter blades during one revolution of the cam. A manually operable switch controlling the motor is located so near the focusing knob of the microscope that the switch may be simultaneously operated with the knob. A resistor is connected in series with the switch so that the voltage across the terminals of the resistor when the switch is closed is applied to a pulse-producing circuit, the output pulse of which is applied to the gate electrode of a silicon-controlled rectifying element connected in series to the motor thereby starting the motor. When the movable contact of a SPDT switch is shifted by the rotation of the aforementioned cam, the rectifying element is short-circuited. After the cam has made a complete revolution, the SPDT switch connects a resistor in parallel to the motor so that the motor is stopped in the initial position of the cam, whereby the mechanism is ready for the next operation of the shutter.

3,625,127

AUTOMATIC RELEASE MECHANISM OF AN ELECTRONIC SHUTTER

BACKGROUND OF THE INVENTION

The present invention relates to a release mechanism for the shutter of a camera used on a microscope to photograph an object while the same is being observed.

It is known to provide a microscope with a photographing device in such a manner that the exposure can be made while the object is being observed so that a desired view is photographed. However, the shutter of the camera and its release mechanism are in general located on the upper portion of the microscope remote from the focusing know of the microscope which is in general located in the lower portion of the body microscope. Therefore, it is inconvenient and difficult to cooperate the release and focusing knob simultaneously while the object is being observed. This is a serious shortcoming when a moving object is to be photographed in a desired condition.

The present invention aims at avoiding the above-described disadvantages of the prior art microscope provided with a photographing device.

SUMMARY OF THE INVENTION

The release mechanism of the present invention comprises a cam rotated by a motor, a release member actuated by the cam so as to be moved from its rest position in which it closes the shutter blades to an actuated position in which it opens the blades and again returned to the initial position during rotation of the cam, a pulse-generating circuit connected to a manually operable switch which supplies an output pulse to a silicon-controlled rectifying element connected in series to the motor so as to render the rectifying element conductive when the switch is closed to start the motor, a resistor adapted to be connected in parallel to the motor by a SPDT switch by the cam in such a manner that, when the cam is rotated to actuate the release member so as to open the blades, the last-mentioned switch disconnects the resistor and short-circuits the rectifying element so as to cut the holding current thereof thereby making the same nonconductive while the motor continues to be energized through the SPDT switch, but, when the cam is rotated the predetermined amount, the switch again connects the resistor in parallel to the motor while the motor is deenergized, so that the motor is stopped, thereby stopping the cam at a position to keep the release members in its initial position ready for the next operation.

The manually operable switch is located so close to the focusing knob of the microscope that the switch may be operated by the observer's hand without requiring the hand to be detached from the focusing knob.

DETAILED DESCRIPTION OF THE PREFERRED EMBODIMENT

Figure 1:
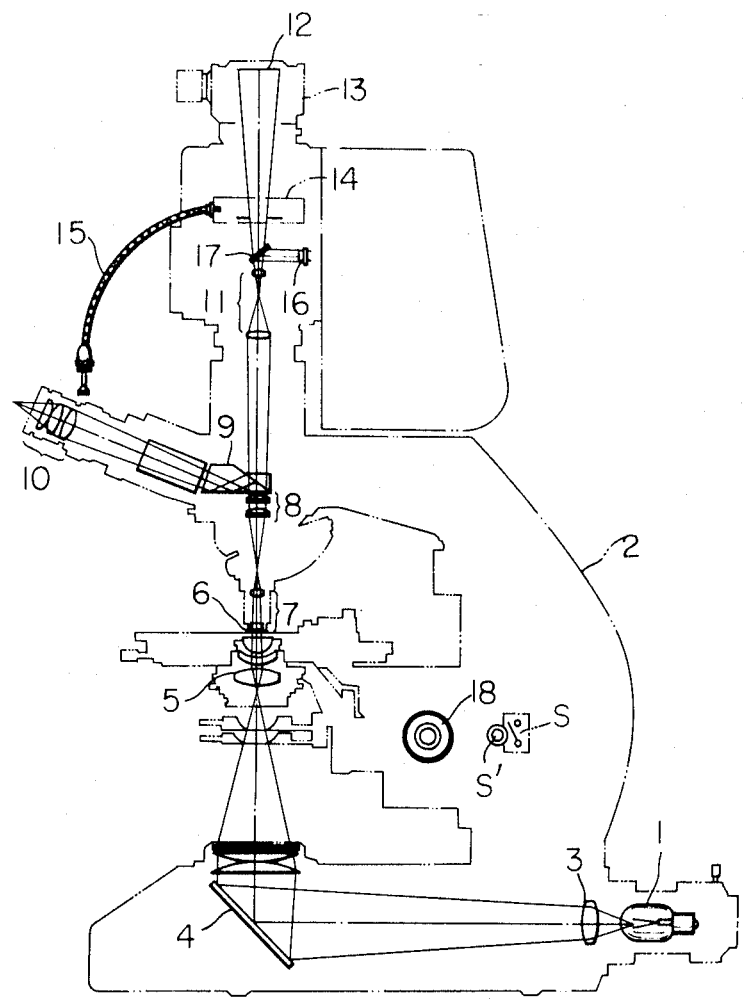
FIG. 1 is a schematic side view of a microscope provided with a camera according to the invention.

Referring to FIG. 1, there is shown a microscope of a lamp 1 is located in partly known structure. A lamp 1 is located in the base 2 of the microscope stand 2. The light of the lamp 1 is directed by a lens 3, mirror 4, and a condenser lens system 5 to an object 6 to be inspected.

The light from the object 6 passes through an objective lens 7, and an intermediate lens system 8 to by a beam-splitting prism 9 by which a portion of the light is reflected toward an eyepiece 10 while the remainder of the light is directed to a camera lens 11 so that an image of the object 6 is focused on a film 12 in the camera 13 which is detachably mounted on the stand 2. A shutter 14 is located behind the lens 11. The shutter 14 may be released by cable release 15. The proper exposure of the film 12 obtained by a photoelectric element 16 which receives a portion of the light passing through the taking lens 11 by means of a semitransparent mirror 17 located behind the lens 11.

A focusing knob 18 is located on the lower portion of the stand 2 remote from the release cable 15. Therefore, it is inconvenient to and operate the release while focusing.

In accordance with the present invention on a manually operable switch button S' for releasing the shutter 14 is located adjacent to the knob 18 so that the switch S' can be operated simultaneously with the knob 18.

Figure 2:
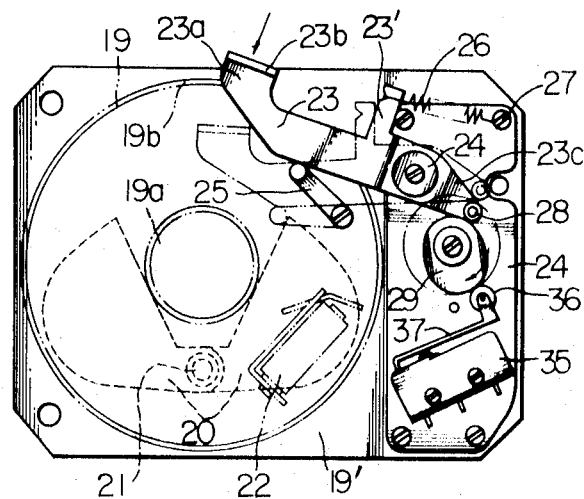
FIG. 2 is a plan view of the release mechanism in the camera of FIG. 1.
Figure 3:
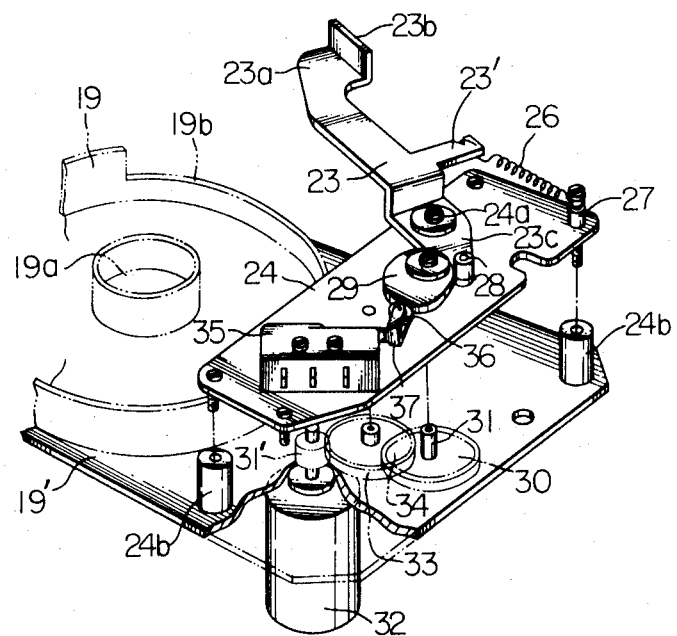
FIG. 3 is a fragmentary perspective view of the release mechanism of FIG. 2.

FIGS. 2 and 3 show the release mechanism of the present invention. A casing 19 is mounted above the lens 11, and its baseplate 19' has a central opening 19a for passing the light from the lens to the film 12. Shutter blades 20 are swingably mounted on the casing 19 about a shaft 21 so that the opening 19a is normally closed by the blades 20 under the action of an electromagnet 22 while the blades 20 open the opening 19a when a release lever 23 mounted on a plate 24 by a shaft 24a is moved counterclockwise into the casing 19 through an aperture 19b to the position indicated by chain-dotted lines so as to actuate a release link 25 coupled with the blades 20. The plate 24 is mounted on the baseplate 19' by means of spacers 24b.

The lever 23 is normally biased in a clockwise direction by a spring 26 one end of which is secured to a projection 23' of the lever 23 while the other end is on a pin 27 secured to the baseplate 19'. One arm 23a of the lever 23 has an upright portion 23b which permits the release lever to be operated manually. The other arm 23c of the lever 23 carries a roller 28 which is urged against an eccentric cam 29 rotatably mounted on the upper plate 24 by the spring 26. A gear 30 is connected to the cam 29 by a shaft 31 and is coupled with a pinion 31' of an electric motor 32 through reduction gearing including a pinion 33 and a gear 34 so that the cam 24 is rotated by the motor 32 once in half a second.

A SPDT switch 35 is located adjacent the cam 29 diametrically opposite the roller 28. A roller 36 on the actuator 37 of the switch 35 engages the cam 29 so that the switch 35 is actuated once during each revolution of the cam 29.

Figure 4:
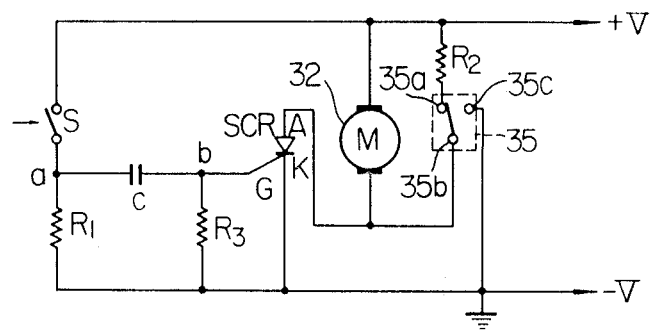
FIG. 4 is illustrates the electric circuit of the release mechanism.

The electric circuit used in the release mechanism of the present invention is illustrated in FIG. 4.

The plus terminal +V of an electric source is connected to one terminal of the switch S which is actuated by the button S' in FIG. 1 while the other terminal of the switch S is connected to one terminal of a first resistor $R_1$, the other terminal of which is connected to the minus terminal −V. One terminal of the motor 32 is connected to the plus terminal +V, while the other terminal of the motor is connected to the anode A of a silicon-controlled rectifying element SCR, the cathode K of which is connected to the minus terminal −V.

One terminal of a second resistor $R_2$ is connected to the plus terminal +V and the other terminal is connected to a stationary contact 35a of the switch 35. The movable contact 35b of the switch 35 is connected to the junction between the anode A of the rectifying element SCR and the other terminal of the motor 32, while the other stationary contact 35c of the switch 35 is connected to the minus terminal −V of the electric source.

The movable contact 35b is coupled with the actuator 37. When the release lever 23 is positioned by the cam 29 in a first position which the blades 20 close the opening 19a, the movable contact 35b is engaged by the cam 29 with the stationary contact 35a to which the second resistor $R_2$ is connected, while the movable contact 35b is switched to the other stationary contact 35c when the cam 29 is rotated to move the release lever 23 to a position, referred to as the actuated position hereinafter, in which the blades 20 uncover the opening 19a. When the cam 29 is rotated through one complete revolution the movable contact 35b is switched to the stationary contact 35c and back to the stationary contact 35a, while the release lever 23 is moved from its initial rest position to the actuated position and again back to the rest position.

A pulse-producing circuit is formed by a capacitor C and a third resistor $R_3$ connected in series. One terminal of the capacitor C is connected to the junction a of the switch S and the first resistor $R_1$, while the terminal of the third resistor $R_3$ remote from the junction b of the capacitor C and the resistor $R_3$ is connected to the minus terminal −V of the electric source. The junction b is connected to the gate electrode G of the rectifying element SCR.

Figure 5:
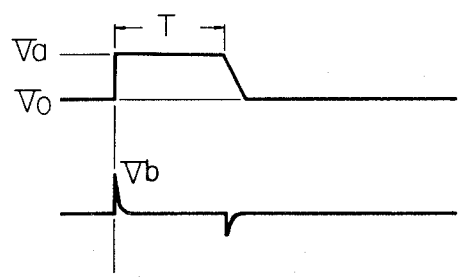
FIG. 5 is a diagram showing the waveform of voltage appearing in the circuit of FIG. 4.

In operation, the cam 29 is set to position the release lever 23 at the rest position and the switch S is closed by the operator when a desired view is to be photographed during the observation of the object. Then, a voltage Va shown in FIG. 5 is a generated between the terminals of the first resistor $R_1$ during the time T when the switch S is closed so that an output pulse Vb is generated at the junction b and supplied to the gate electrode G of the rectifying element SCR thereby making the same conductive. Therefore, the motor 32 is energized to rotate the cam 29 so that the release lever 23 is moved from the initial rest position to the actuated position so as to open the blades 20 while the movable contact 35b is switched to the stationary contact 35c, thus short-circuiting the rectifying element SCR and cutting the holding current thereof, whereby the rectifying element SCR is rendered nonconductive. But the motor 32 continues to rotate, because the electric current is supplied to the motor 32 through the movable contact 35 b now connected to the stationary contact 35c.

The film 12 is exposed while the motor 32 continues to rotate.

When the cam 29 is rotated through one revolution by the motor 32, the movable switch 35b is again switched to the stationary contact 35a while the release lever 23 is moved to the initial position. The second resistor $R_2$ is connected in parallel to the motor 32 while the electric current to the motor is cut, because the rectifying element SCR has become nonconductive, so that the motor 32 is stopped to maintain the cam 29 in the position at which the release lever 23 is held in the initial rest position while the movable contact 35b is held in contact with the stationary contact 35a to be ready for the next cycle of operation.

An output pulse is generated at the junction b of the pulse-producing circuit when the switch S is opened. However, this output pulse is of opposite sign to the output pulse so that the rectifying element SCR is not actuated. Therefore, the above-described operation of the release mechanism takes place even when the switch S is closed during operation of the release mechanism or opened after having been closed.

I claim:

1. An automatic shutter release mechanism in a photographic device for use in a microscope adapted to photograph an object while the same is being observed, said release mechanism having a release member coupled with blade means of said shutter and movable between a rest position in which said blade means is closed and an actuated position in which said blade means is opened, a rotatable cam means coupled with said release member for moving the release member between said rest and actuated positions when said cam means is rotated by a predetermined amount, an electric motor for rotating said cam means, an electric source having plus and minus terminals, and a normally open switch in circuit with said source and said motor, and manually operable for energizing said motor, wherein the improvement comprises electrical control means having a. a first resistor having one terminal connected to one terminal of said switch,
   1. the opposite terminal of said switch being connected to said plus terminal of said electric source,
   2. the opposite terminal of said resistor being connected to the minus terminal of said source;
b. a silicon-controlled rectifying element having its anode connected to one terminal of said motor, and its cathode connected to said minus terminal of said electric source;
   1. the opposite terminal of said motor being connected to said plus terminal of said electric source;
c. a second resistor having one terminal connected to said plus terminal of said electric source;
d. a switching means having two stationary contacts and a third contact movable by said cam means between respective positions of conductive engagement with said two contacts,
   1. one of said two stationary contacts being connected to the other terminal of said second resistor, and
   2. the other stationary contact being connected to said minus terminal of said electric source;
e. a pulse-producing circuit consisting of a capacitor and a third resistor connected in series across said first resistor,
   1. the junction of said capacitor and said third resistor being connected to the gate electrode of said rectifying element, thereby permitting an output pulse of said pulse-producing circuit to be applied to said gate electrode so as to render said rectifying element conductive when said manually operable switch is closed,
   2. said movable contact of said switching means being so coupled with said cam means that said movable contact is connected to said terminal of said second resistor when said release member is in said rest position, whereas said movable contact is connected with said minus terminal of said electric source when said release member is moved by said cam means to said actuated position, thereby short-circuiting said rectifying element and cutting the holding current supplied thereto so that the same is made nonconductive,
   3. said movable contact being connected to said other terminal of said second resistor as the cycle draws to a close, thereby connecting said second resistor in parallel to said motor so as to brake the same, so that said cam means is stopped in a position in which said release member is kept in said rest position and said blade means is kept closed by said release member.

2. Mechanism according to claim 1, wherein said normally open switch is located close to the position of a focus-adjusting knob means of said microscope, thereby permitting said switch to be operated by an observer's hand without requiring the hand to be detached from said focusing-knob means.

* * * * *